(12) United States Patent
DeCordt et al.

(10) Patent No.: US 6,982,062 B2
(45) Date of Patent: Jan. 3, 2006

(54) CORROSION INHIBITING COMPOSITION

(75) Inventors: Frank L. M. DeCordt, Ranst (BE); Niklas Dahlberg, Torslanda (SE); Joseph Mihelic, Sparta, NJ (US); Michelle Blackowski, Paterson, NJ (US)

(73) Assignee: Ashland Inc., Dublin, OH (US)

( * ) Notice: Subject to any disclaimer, the term of this patent is extended or adjusted under 35 U.S.C. 154(b) by 76 days.

(21) Appl. No.: 10/624,444

(22) Filed: Jul. 22, 2003

(65) Prior Publication Data

US 2005/0017220 A1 Jan. 27, 2005

(51) Int. Cl.
*C23F 11/02* (2006.01)
*C23F 11/12* (2006.01)
*C23F 11/14* (2006.01)
*C09K 15/06* (2006.01)
*C09K 15/18* (2006.01)
*C09K 15/20* (2006.01)

(52) U.S. Cl. ............... 422/16; 252/390; 252/392; 252/393; 252/396; 252/401; 252/403; 252/405; 252/407; 106/14.15

(58) Field of Classification Search ........... 252/390, 252/392, 394, 396, 401, 403, 405, 407; 106/14.13, 106/14.15, 14.16; 422/7, 9, 10, 16, 17
See application file for complete search history.

(56) References Cited

U.S. PATENT DOCUMENTS

| | | | | |
|---|---|---|---|---|
| 4,219,433 A | * | 8/1980 | Manabe et al. ............... 252/75 |
| 4,275,835 A | * | 6/1981 | Miksic et al. ................. 239/60 |
| 4,404,113 A | * | 9/1983 | Peters et al. .................. 252/75 |
| 4,514,315 A | * | 4/1985 | Matulewicz et al. .......... 252/75 |
| 4,792,464 A | * | 12/1988 | Martenson ................... 427/156 |
| 5,080,818 A | * | 1/1992 | Tachiiwa et al. .............. 252/75 |
| 5,415,896 A | * | 5/1995 | Mulvihill et al. ........ 427/388.4 |
| 5,422,187 A | * | 6/1995 | Miksic et al. ............... 428/545 |
| 5,597,514 A | | 1/1997 | Miksic et al. ............... 252/390 |
| 5,840,381 A | * | 11/1998 | Ohtsuka .................... 428/34.4 |
| 5,855,975 A | * | 1/1999 | Miksic et al. .............. 428/35.8 |
| 6,464,899 B1 | * | 10/2002 | Haas et al. .............. 252/389.1 |
| 6,540,959 B1 | * | 4/2003 | Reinhard et al. .............. 422/8 |

* cited by examiner

*Primary Examiner*—Joseph D. Anthony
(74) *Attorney, Agent, or Firm*—David L. Hedden

(57) ABSTRACT

This invention relates to a corrosion inhibiting composition comprising (a) an aliphatic amine, (b) an azole selected from the group consisting of (1) tolyltriazole, (2) benzotriazole, and (3) mixtures thereof, and (c) a benzoate. The compositions are particularly useful in inhibiting the corrosion of metal equipment, particularly equipment made from cast iron and aluminum, and more particularly, engine blocks that have been subjected to water flushing. The invention also relates to a process for inhibiting corrosion, particularly the vapor phase corrosion of metal equipment.

7 Claims, No Drawings

CORROSION INHIBITING COMPOSITION

TECHNICAL FIELD OF THE INVENTION

This invention relates to a corrosion inhibiting composition comprising (a) an aliphatic amine, (b) an azole selected from the group consisting of (1) tolyltriazole, (2) benzotriazole, and (3) mixtures thereof, and (c) a benzoate. The compositions are particularly useful in inhibiting the corrosion of metal equipment, particularly equipment made from cast iron and aluminum, and more particularly, engine blocks that have been subjected to water flushing. The invention also relates to a process for inhibiting corrosion, particularly the vapor phase corrosion of metal equipment.

BACKGROUND OF THE INVENTION

It is useful to test metal equipment, e.g. automotive engines, after manufacturing them, for leaks that prevent proper operation of the engine. In order to test the engines for leaks, water is circulated in the cooling space of the engine block and hydrostatic testing is conducted. The engines are then drained for storage, shipping, and assembly. After draining, a small amount of liquid remains in recesses at the bottom of the engine, which causes the metal to corrode. It is known that a mixture of an amine and an azole will prevent corrosion of metal equipment caused by water in its liquid state. However, this mixture is not effective in preventing vapor phase corrosion, which occurs by the further evaporation of water after the hydrostatic test water is drained from the engine block. Thus, there is a need to prevent vapor phase corrosion in such equipment, particularly where the equipment contains recesses where water can reside and evaporate.

All citations referred to under this description of the "Related Art" and in the "Detailed Description" of the invention are expressly incorporated by reference.

SUMMARY OF THE INVENTION

This invention relates to a corrosion inhibiting composition comprising (a) an aliphatic amine, (b) an azole selected from the group consisting of (1) tolyltriazole, (2) benzotriazole, and (3) mixtures thereof, and a benzoate. The compositions are particularly useful in inhibiting the corrosion of metal equipment, e.g. engine blocks, which contain recesses where water can reside and evaporate after the equipment had been flushed with water. The invention also relates to a process for inhibiting corrosion, particularly the vapor phase corrosion of metal equipment, particularly equipment made from cast iron and aluminum.

Aldonic acids, as taught in U.S. Pat. No. 5,597,514, are not needed in the corrosion inhibiting compositions.

Another advantage of the invention is the corrosion inhibiting compositions do not require inorganic salts such as phosphates or molybdates for them to be effective. The absence of inorganic salts also minimizes the occurrence of dry residues.

DETAILED DESCRIPTION

The detailed description and examples will illustrate specific embodiments of the invention will enable one skilled in the art to practice the invention, including the best mode. It is contemplated that many equivalent embodiments of the invention will be operable besides these specifically disclosed.

Any water-soluble aliphatic or cycloaliphatic amine or aliphatic alkanolamine which is a liquid at room temperature and has an appreciable vapor pressure can be used as the amine in the corrosion inhibitor composition. Examples include primary amines such as methoxypropylamine; secondary amines such as dimethylamine and diethylamine; tertiary amines such as triethylamine; cycloaliphatic amines such as cyclohexylamine, piperazine and morpholine; and alkanolamines such as monoethanolamine, diethanolamine, triethanolamine, diethyl ethanolamine and aminomethyl propanol. Preferably used is an alkanolamine, most preferably triethanolamine.

Any benzoate can be used in the corrosion inhibitor composition. Examples include ammonium benzoate, amine benzoates (e.g. diethylamine benzoate, cycloaliphatic amine benzoates (e.g. cyclohexylamine benzoate), alkanolamine benzoates (e.g. triethenolamine benzoate). Preferably used is ammonium benzoate.

The weight ratio of amine to azole in the composition is from 50:1 to 30:1, preferably 35:1 to 45:1 most preferably about 40:1. The weight ratio of benzoate to azole in the composition is from 40:1 to 150:1, preferably about 80:1 to 120:1, most preferably about 100:1. The amount of corrosion inhibiting composition used in the aqueous system treated is typically from 1 percent to 5 percent in water, preferably 1.5 percent to 3 percent.

The components of the corrosion inhibitor can be used separately, or mixed in a variety of ways, before adding them to the aqueous system to be treated. The components can be added neat, when practical, or diluted with water before adding them to the aqueous system to be treated. It has been found useful to use a mixture of amine and azole, which is subsequently mixed with the benzoate before adding to the aqueous to be treated.

The treatment time usually last several months. When the process of this invention is used, any heel of water in the recesses of the drained engine block, treated with this composition, will not cause any problems when the coolant is added and the engine is used.

Optional components include nonionic surfactants, particularly those useful for facilitating the penetration of oil contaminants. The weight ratio surfactant to corrosion inhibitor composition is typically from 1:100 to 1 to 10.

Abbreviations

The following abbreviations are used:

AMAZ comprises about 55 weight percent deionized water, about 44 weight percent triethanolamine (98% active), and about 1 weight percent sodium salt of tolyltriazole.

AB comprises about 100 weight percent ammonium benzoate.

EXAMPLES

While the invention has been described with reference to a preferred embodiment, those skilled in the art will understand that various changes may be made without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention include all embodiments falling within the scope of the appended claims. In this application all units are in the metric system and all amounts and percentages are by weight, unless otherwise expressly indicated.

Control A, Comparison Examples B and C, and
Examples 1 and 2 (Examples Using D9 Cast Iron Coupon)

A D9 cast iron coupon is dipped (10 percent of the coupon is submerged) in the solutions set forth in Table I for one minute. Then the entire coupon is immersed in city tap water. The amount of corrosion is observed by visual inspection on a daily basis.

TABLE II (Corrosion tests on D9 cast iron coupon)

| Example | Solution | Result[1] |
|---------|----------|-----------|
| A | Control | Corrosion occurred overnight. Bottom water was brown and rusty. There was a uniform coat of rust on top, bottom, and sides of coupon. |
| B | 3% AB | Corrosion occurred overnight. Bottom water was brown and rusty. There was a uniform coat of rust on top, bottom, and sides of coupon. |
| C | 3% AMAZ | Pinpoint corrosion seen after 1 day. |
| 1 | 1.5% AB 1.5% AMAZ | No corrosion after 2 weeks |
| 2 | 3% AB 3% AMAZ | No corrosion after 2 weeks |

[1]All corrosion was in the vapor phase.

The results in Table I indicate that a mixture of amine, azole, and ammonium benzoate allows for complete corrosion protection of cast iron when in contact with water in both the water and vapor phases with respect to D9 cast iron. On the other hand the mixture of amine and azole is inadequate, as is the ammonium benzoate when used alone.

Control, Comparison Examples D, E, F, and Examples 3 and 4 (Examples using D12 cast iron coupon)

These examples were carried out according as before, except a D12 cast iron coupon is used in the tests. The results are set forth in Table II.

TABLE II (Corrosion tests on D12 cast iron)

| Example | Solution | Result[2] |
|---------|----------|-----------|
| D | Control | Corrosion occurred overnight. Bottom water was brown and rusty. There was a uniform coat of rust on top, bottom, and sides of coupon. |
| E | 3% AB | Corrosion occurred overnight. Bottom water was brown and rusty. There was a uniform coat of rust on top, bottom, and sides of coupon. |
| F | 3% AMAZ | Pinpoint corrosion seen after 1 day. |
| 3 | 1.5% AB 1.5% AMAZ | Pinpoint corrosion seen after 1 day. |
| 4 | 3% AB 3% AMAZ | No corrosion after 2 weeks |

[2]All corrosion was in the vapor phase.

The results in Table II indicate that a mixture of amine, azole, and ammonium benzoate allows for complete corrosion protection of cast iron when in contact with water in both the water and vapor phases with respect to D12 cast iron. On the other hand the mixture of amine and azole is inadequate as is the ammonium benzoate when used alone.

Control, Comparison Examples G, H, I, and Examples 5 and 6 (Examples Using Aluminum Coupon)

These examples were carried out as before, except an aluminum coupon was used in the tests. The results are set forth in Table III.

TABLE III (Corrosion tests on aluminum coupon)

| Example | Solution | Result[3] |
|---------|----------|-----------|
| G | Control | Darkening mostly at the water line. A white precipitate is seen in the water phase, probably aluminum oxide. |
| H | 3% AB | Darkening mostly at the water line. No precipitate is present in water phase. |
| I | 3% AMAZ | Darkening mostly at the water line. No precipitate is present in water phase. |
| 5 | 1.5% AB 1.5% AMAZ | No corrosion after 2 weeks |
| 6 | 3% AB 3% AMAZ | No corrosion after 2 weeks |

[3]All corrosion was in the vapor phase.

The results in Table III indicate that a mixture of amine, azole, and ammonium benzoate allows for complete corrosion protection of aluminum when in contact with water in both the water and vapor phases with respect to aluminum. On the other hand the mixture of amine and azole is inadequate as is the ammonium benzoate when used alone.

We claim:

1. A process for inhibiting the vapor phase corrosion of drained metal equipment that contains one or more recesses where water can reside which comprises:

adding an effective corrosion inhibiting amount of a corrosion inhibitor composition comprising:

(a) an aliphatic amine or an aliphatic alkanolamine, (b) an azole selected from the group consisting of (1) tolyltriazole, (2) benzotriazole, and (3) mixtures thereof, and (c) a benzoate, to said drained equipment, such that the weight ratio of aliphatic amine or aliphatic alkanolamine to azole in the composition is from 50:1 to 30:1 and the weight ratio of benzoate to azole in the composition is from 40:1 to 150:1, and such that the corrosion inhibiting composition contains less than 1.0 part of an inorganic salt per hundred parts of corrosion inhibiting composition.

2. The process of claim 1 wherein the amount of corrosion inhibiting composition used is from 1 percent to 5 percent.

3. The process of claim 2 wherein the metal equipment is made from a metal selected from the group consisting of cast iron and aluminum.

4. The process of claim 3 wherein the metal equipment is an automotive engine.

5. The process of claim 1 wherein component (a) is an alkanolamine.

6. The process of claim 5 wherein the benzoate is ammonium benzoate.

7. The process of claim 6 wherein the weight ratio of aliphatic amine or aliphatic alkanolamine in the composition is about 35:1 to 45:1 and the weight ratio of benzoate to azole in the composition is from about 80:1 to 120:1.

* * * * *